Figure 5:
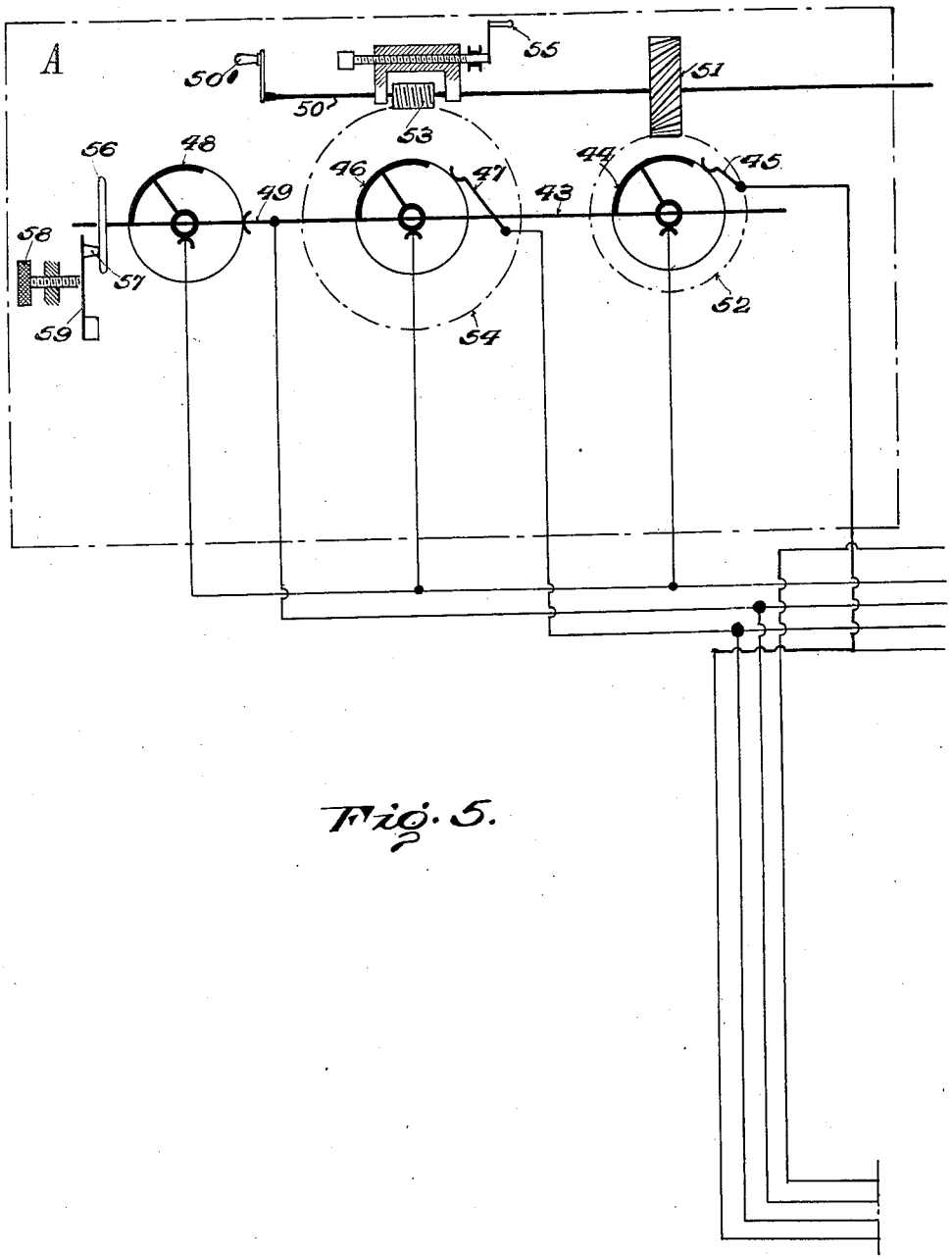

July 3, 1934.   N. E. METHLIN   1,965,046
ELECTRICAL DISTANT INDICATING APPARATUS
Original Filed July 8, 1929   4 Sheets-Sheet 1
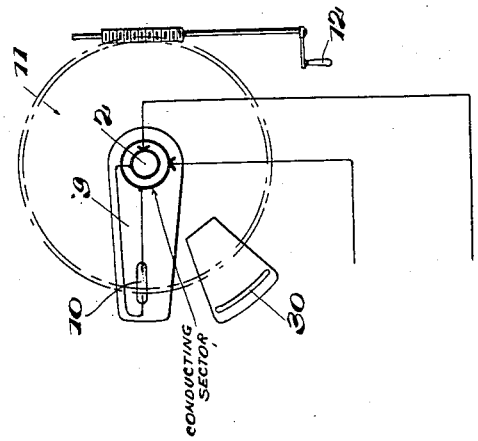
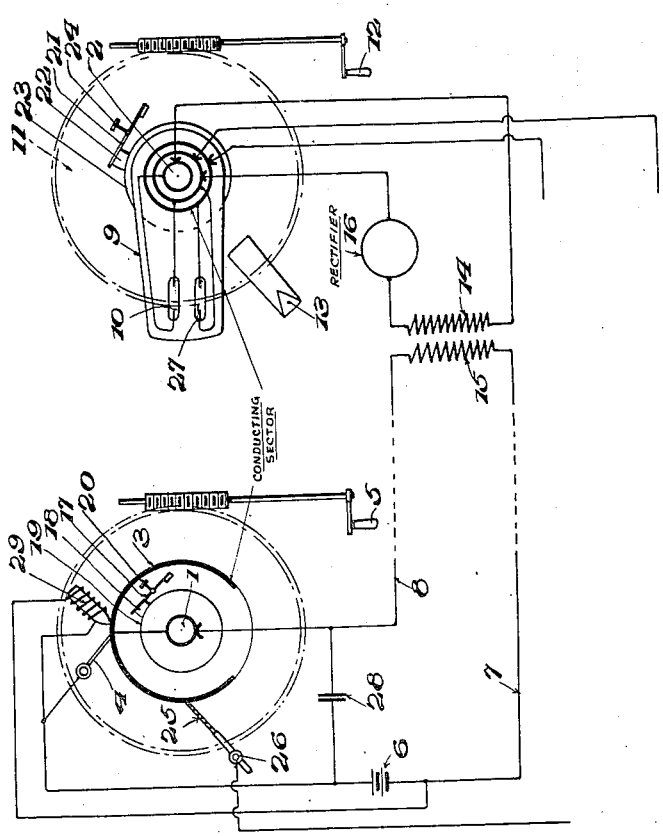

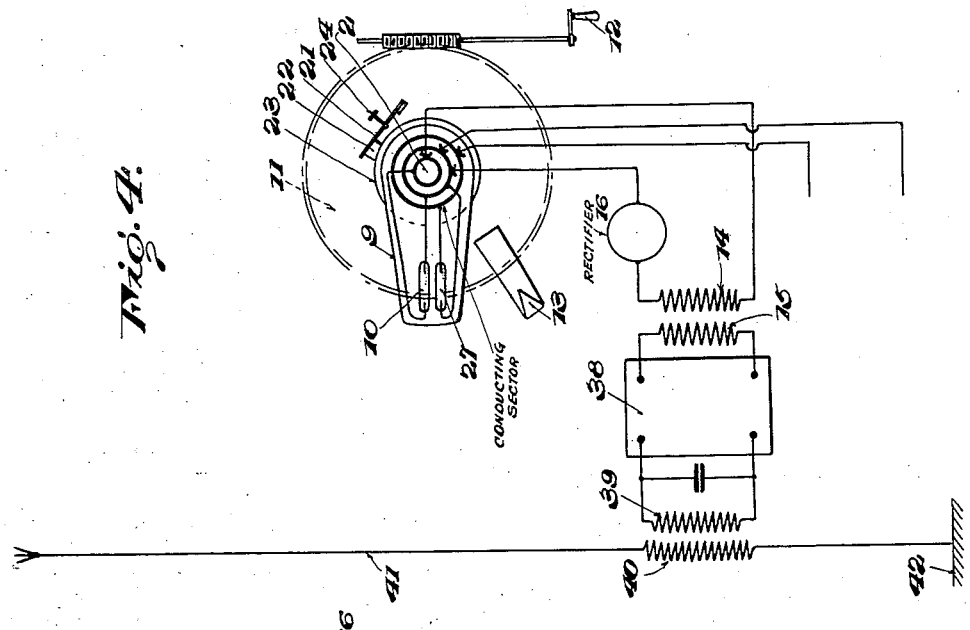
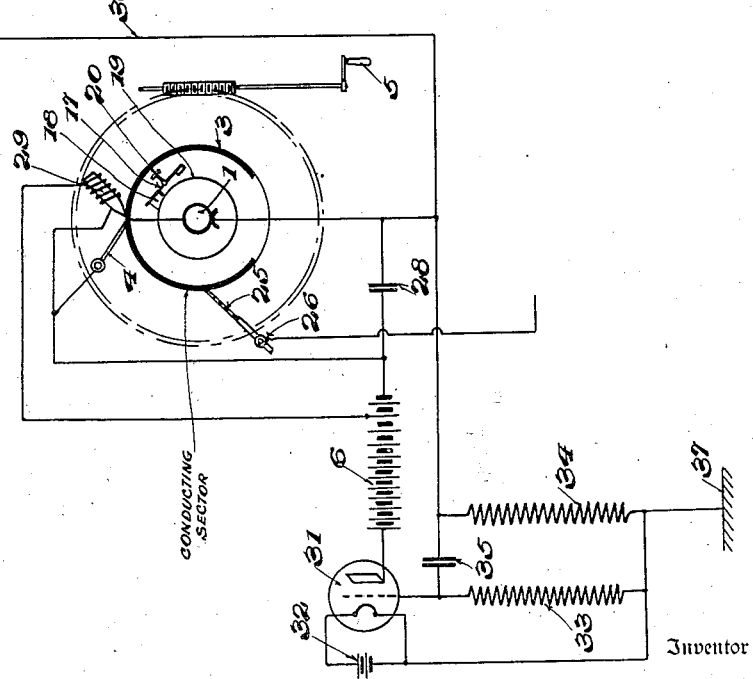

Patented July 3, 1934

1,965,046

UNITED STATES PATENT OFFICE 1,965,046

ELECTRICAL DISTANT INDICATING APPARATUS

Nicolas Emilien Methlin, Paris, France, assignor to Schneider & Cie, Paris, France, a company of France Continuation of application Serial No. 376,676, July 8, 1929. This application September 29, 1930, Serial No. 485,232. In France July 10, 1928

4 Claims. (Cl. 177—337)

This invention relates to improvements in or modifications of the invention claimed in U. S. Patent No. 1,775,368, dated September 9, 1930.

The object of the present invention is to provide an improved form of construction of the apparatus according to the said prior specification which is adapted for use in the case when use is made at both stations of rotating field synchronous motors of the type described in U. S. Patent No. 1,807,001, dated May 26, 1931.

It has been established in practice that by providing these motors with suitable damping their pendular oscillations can be rendered completely negligible. It has also been established in practice that for the motors of the receivers which always turn under no load the phase displacement of the rotor with respect to the rotating field remains constant.

But practice has shown that for the motor of the transmitter, the phase displacement of the rotor with respect to the revolving field does not remain constant; and it has been recognized that this disadvantage is due to variations of the resisting couple exercised by the friction of the brushes on the roating commutator. Practice has also shown that indications can be disturbed by wear of the brush of the rotating commutator by reason of displacement of the generatrix of contact of the brush.

According to the invention the motor at the transmitter is provided with a small brake having a graduated action of the known type which permits the possible variations in the resisting couple developed by the friction of the brushes of the rotary switch to be compensated.

This brake is actuated by hand by an auxiliary gun servant who controls its action in accordance with the observation of a controlling receiving station coupled to the transmitter and the counter-index of which is actuated mechanically by the control handle of the transmitter. The function of this auxiliary gun servant is to return the pointer in front of the counter-index.

It is necessary to indicate that the operation effected by the auxiliary gun servant at the transmitting station has the effect not only of correcting errors which might result from a variation in the resisting couple, but also at the same time of correcting errors which might result from an abnormal displacement of the position of the contacting line of the brush upon the rotating switch (which displacement might be caused for example by wear of the said brush).

The improvement thus permits carbon brushes to be employed.

When use is made of the combination provided for in Patent No. 1,775,368, consisting of two distant indicators employed for transmitting the precise indication and for transmitting a rough indication respectively, it will be necessary to interpose a differential gear in the control for the brush which gives the rough indication so as to permit the auxiliary gun servant to correct the errors which might result from an abnormal displacement of the contacting line on the rotating switch.

The use of rotating field synchronous motors of the type indicated above makes it necessary to add devices which permit the bringing into step of each receiver to be controlled because each time a new transmission is effected, this bringing into step may be effected either in agreement with that at the transmitter or with a phase displacement of 180°. It also makes it necessary to employ a device permitting the bringing into step of each receiver to be corrected when desired, so as to be able to ensure the return to agreement.

According to the invention, the control of the bringing into step is obtained by the addition of a special brush on the rotating switch of the transmitter, this brush giving an indication of a fixed reference point by the addition of a connection (along wires or by wireless) permitting this indication to be transmitted, and by the addition at each receiver of a gas tube permitting the indication of the fixed reference point to be received, or, more simply, by the addition, at each receiver, of a switch permitting the indication of the fixed reference point to be received temporarily upon one of the tubes normally employed for receiving order signals.

In conformity to the invention, moreover, a small brake is provided at each receiver which permits an out of step displacement of 180° of the rotor to be produced. This 180° out of step is obtained very easily by acting gradually upon the brake and then releasing the latter suddenly at the moment when the pointer which gives the indication of the fixed reference point has been displaced through 90°.

The invention finally provides for the possibility of employing high frequency currents for illuminating the tubes instead of instantaneous currents, these high frequency currents having a certain duration and giving the pointer the appearance of circular arcs extending over a certain portion of the circumference (5 to 10°, for example).

It is sufficient for this purpose to employ special counter pointers which no longer adopt the triangular shape but have the form of a circular arc extending over the circumferential region indicated above.

This last improvement is of very special interest when the transmission is effected by means of Hertzian waves because it permits a direct use to be made of a modulation of suitable frequency.

Figure 6:
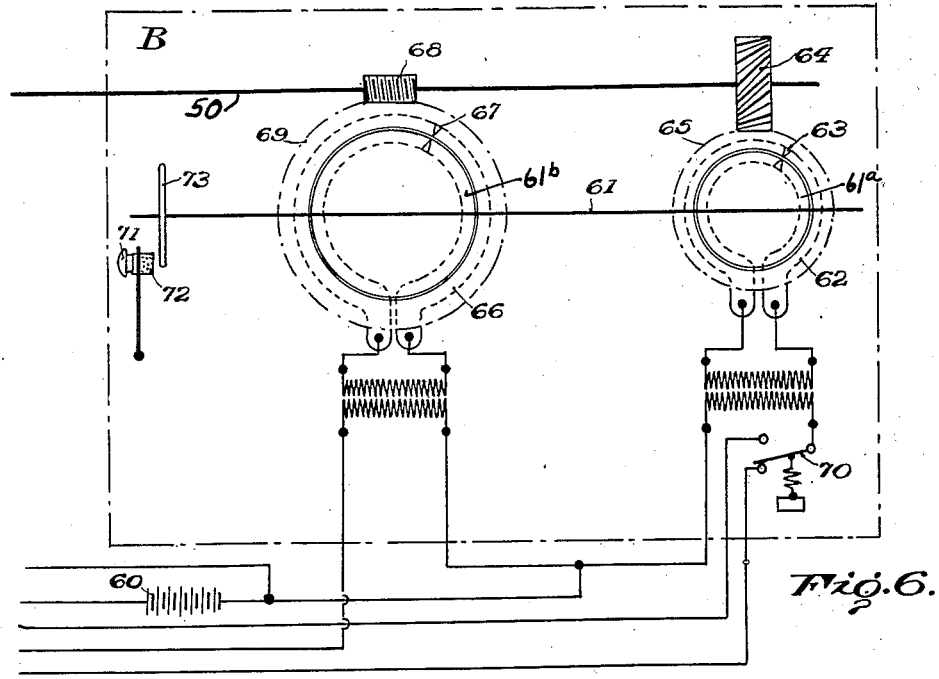
Figure 7:
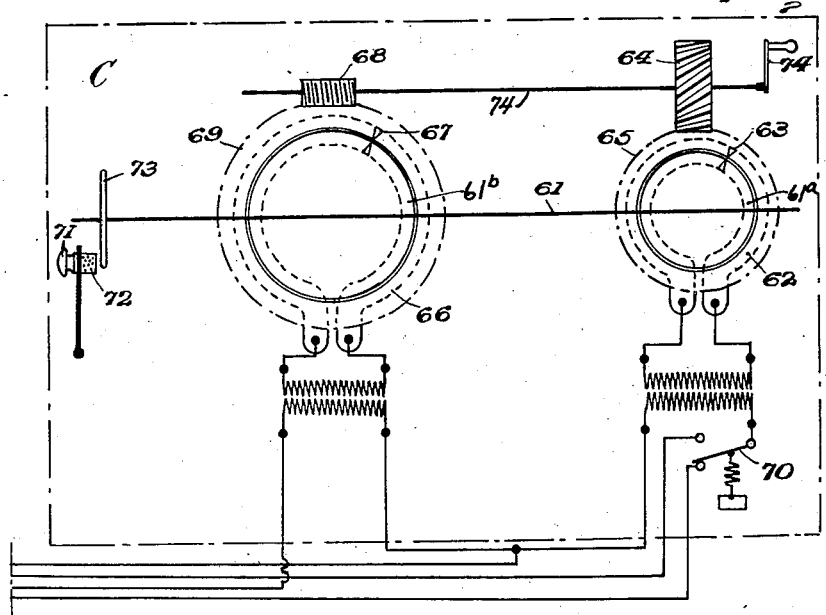

The invention is illustrated diagrammatically in the accompanying drawings, wherein Fig. 1 illustrates diagrammatically an embodiment of the invention employing a wire transmission;

Fig. 2 illustrates diagrammatically a receiving station adapted for the use of high frequency currents for illuminating the tube;

Figs. 3 and 4 illustrate, respectively, a transmitting station and a receiving station for radiant energy which embodies the invention; and Figs. 5, 6 and 7 illustrate diagrammatically an indicating system comprising a second embodiment of the invention employing a wire transmission, Fig. 5 illustrating a transmitting station, Fig. 6 a controlling receiving station, and Fig. 7 a controlled receiving station.

In Fig. 1, 1 and 2 are the shafts of two synchronous motors rotating in the same direction and placed one at the transmitting station and the other at the receiving station respectively. Preferably the synchronous motors are of the type described in Patent No. 1,807,001 above referred to.

The synchronous motor having the shaft 1 is adapted to actuate a suitable device which periodically makes and breaks an electric circuit at the transmitting station. In the form shown, the shaft 1 actuates a rotary switch comprising a conducting sector 3 integrally secured to 1 and a brush 4 carried by a toothed disk which may be rotated about 1 (in order to place 4 in the position corresponding to the order to be transmitted), by acting by hand upon the handle 5. The brush 4 is connected to one of the poles of a battery 6 the second pole of which is connected to the connecting wire 7. The sector 3 is also connected to the connecting wire 8.

The receiving apparatus is placed in a casing or any other cover provided with covered sighting tube, the luminous members to be observed contained in this casing thus moving in semi-darkness. The shaft 2 drives an arm 9 at the end of which is mounted a small electric lamp 10 the action of which is instantaneous, such as a neon tube, for example. A toothed disk 11 is mounted concentrically with shaft 2 and may be made to rotate about shaft 2 by actuating the handle 12. The disk 11 carries a counter index or pointer 13 on which has been deposited by known means a coat of substance which remains constantly luminous in the dark. The electrodes which lead the current to the lamp 10, which electrodes may be within or without the tube, are supplied by the secondary 14 of a transformer, the primary 15 of which is connected to the leads 7 and 8, and in the circuit is interposed a thermionic valve 16 or else an electrolytic valve, which allows only the current generated at the transmitting station when contact between 3 and 4 is broken to reach the lamp 10.

It is consequently seen that for each turn of 1 the lamp 10 will give a flash of light at the exact moment contact is broken between 3 and 4. It will therefore be possible by bringing 13 in front of the position at which the luminous flash is produced to make handle 12 follow the displacement communicated to handle 5.

It may be necessary, in order to assist the operation of the receiver, to give shafts 1 and 2 a speed of rotation of at least ten turns per second so that the image will persist upon the retina for a sufficient length of time to enable the position of lamp 10 by which the luminous flash is produced, to appear in a continuous manner.

As indicated above, the motor at the transmitter is provided with a small brake of any suitable type which, as shown diagrammatically, comprises a supporting arm or the like 17 which carries a brake shoe 18 frictionally engaging a drum or the like 19 secured to the shaft 1, said arm being adjustable by means such as a screw 20 to regulate the friction load. For the purpose of bringing the rotor at the receiver into step, a similar arm 21 may be provided which carries a brake shoe 22 engaging a drum or the like 23 secured to the shaft 2, said arm being adjustable to regulate the friction load by means of a suitable member 24.

A brush 25 is provided at the transmitter which is fixedly mounted at 26 in any suitable manner and engages the rotating sector 3, said brush being connected in any suitable manner, as for example, by means similar to those employed for connecting the brush 4 with the tube 10, with a second tube 27 at the receiver which rotates with the shaft 2. The tube 27 is likewise adapted to flash instantaneously like tube 10, and may be mounted on the rotating arm 9. It will be seen that the flashes of the tube 27 will give at the receiver an indication of a fixed reference point with respect to the shaft 1 at the transmitter.

If desired, and as illustrated in Figs. 6 and 7, tube 27 can be omitted and its function fulfilled by the substitution of a switch permitting optional connection of brush 25 to the primary 15 of the transformer whereby the indication of the fixed reference point can be received temporarily upon tube 10 normally employed for receiving order signals.

Preferably in order to render the action of the switch at the transmitting station more rapid, a condenser 28 is connected across 3 and 4 and the arc may be blown out magnetically or mechanically, as for example by means of a small electromagnet 29 movable with the brush 4. Similar means may be employed in connection with the brush 25 if desired.

In Fig. 2, the receiver is adapted for the use of high frequency currents of a short duration instead of the instantaneous current provided for in the embodiment of Fig. 1. These currents may be provided in any suitable manner, and since the tube 10 will remain lighted as long as current is received, a luminous arc will result instead of a point, which arc will have an angular extent depending upon the duration of the high frequency current. Preferably the arc extends over only a short portion of the circumference, say 5° to 10°. Instead of the counter-index 13 of Fig. 1, a counter-index 30 in the form of an arc having an angular extent equal to the angular extent of the arc produced by the tube 10 will be employed, said counter-index being mounted on the disk 11. The two arcs may be made to coincide by actuating the handle 12.

In Figs. 3 and 4 in which the reference numerals employed in Fig. 1 are used to indicate similar parts, the transmitting station comprises a wireless telegraphy transmitting installation comprising for example a three-electrode valve 31, a filament battery 32, a grid inductance 33, a plate inductance 34, a condenser 35, an aerial 130

36, a ground 37, and a plate battery 6. This apparatus may be adapted to transmit energy periodically to the receiving station in any suitable way, such as by controlling the grid voltage of the three-electrode valve or by interrupting the plate circuit. In the form shown, the rotary switch 3, 4 actuated by motor shaft 1 is connected in the plate circuit of the valve 31. The transformer 14, 15 of the receiving station is supplied by a valve amplifier 38 connected to a circuit comprising the secondary inductance 39 coupled with the induction coil 40 interposed between the receiving aerial 41 and the ground connection 42. The secondary 14 of the transformer only transmits energy to the receiving station circuit when the transmitting station circuit is made and broken and the thermionic valve 16 allows current to reach the lamp 10 only when the contact between 3 and 4 at the transmitting station is broken. The special brush 25 and the tube 27 may be provided for the purpose of indicating at the receiver a fixed reference point with respect to the rotating shaft 1 at the transmitter, and the brakes 18 and 22 are provided for the purposes indicated above.

When the rotating switch is interposed in the grid circuit of the tube 31 it will be noted that the instantaneous lighting of the lamp 10 will be produced by the effect of a transmission of a certain duration which may be very short by suitably reducing the peripheral surface of 3, in which case the valve 16 may be omitted and a receiving station of the type shown in Fig. 2 employed.

Referring now to Figs. 5, 6 and 7, there is shown therein a signal transmission system embodying another form of the present invention and comprising a transmitting station (Fig. 5), a controlling receiving station (Fig. 6), and a controlled receiving station (Fig. 7). It will be understood that the electrical circuits shown as broken on the two sheets of drawings are continuous, as is shaft 50. This embodiment differs from that of Fig. 1 in that both rough and precision indicators are used, a controlling receiving station is shown, the luminous counter indices and movable tubes are replaced by illuminated counter indices and fixed tubes, and a switch has been substituted for the extra tube 27 for giving an indication of the fixed reference point.

As shown, 43, 61 and 61' are the shafts of three synchronous motors rotating in the same direction and placed at the transmitting station, the controlling receiving station, and the controlled receiving station, respectively. Preferably the motors are of the type described in Patent No. 1,807,001, previously referred to.

The synchronous motor having the shaft 43 is adapted to actuate a suitable device which periodically makes and breaks a plurality of electric circuits at the transmitting station. In the form shown, the shaft 43 actuates a rotary switch having a pair of contacts comprising conducting sectors 44 and 46 integrally secured to shaft 43 and a pair of brushes 45 and 47 carried by toothed disks 52 and 54, respectively, which may be rotated about shaft 43 (in order to place brushes 45 and 47 in positions corresponding to the order to be transmitted) by rotating shaft 50 having a handle 50'. Disk 54 is adapted to give the rough indication of the signal to be transmitted and is hence rotated by a fine-pitched worm 53, while disk 52, the precision indicating disk, is rotated through much larger angles by a large skew-toothed gear 51. Conducting sectors 44 and 46 are connected to one of the poles of a battery 60, the other pole of which is connected through suitable wiring to brushes 45 and 47, and to the various receiving stations next to be described.

At the controlling receiving station (Fig. 6), shaft 61 drives a pair of disks 61ᵃ and 61ᵇ, each of which has adjacent its periphery a triangular shaped opening or index. A pair of toothed disks 65 and 69, each having a triangular shaped opening 63 and 67 adjacent its inner periphery adapted to act as counter indices to those in disks 61ᵃ and 61ᵇ, are mounted concentrically with shaft 61 and are made to rotate thereabout by actuation of shaft 50. Disk 69 is the rough indicator disk corresponding to disk 54 of Fig. 5 and is rotated by a fine-pitched worm 68, while disk 65, the precision indicator disk, is rotated by a large skew-toothed gear 64 similarly to disk 52. Since worms 53 and 68, and gears 51 and 64 are mounted on a common shaft 50, it is evident that the movements of disks 69 and 65 will normally exactly repeat those of disks 54 and 52, respectively. However, due to this difference in angular movement of brushes 45 and 47 when disks 52 and 54 are rotated, it is necessary to interpose a differential gear 55 in the control for the brush which gives the rough indication so as to permit the auxiliary gun servant to correct, the errors which might result from an abnormal displacement of the contacting line on the rotating switch.

The receiving apparatus is placed in a casing or other suitable cover provided with a covered sighting tube, the indices to be observed contained in this casing thus moving in semi-darkness. In order to illuminate these indices, a pair of circular electric lamps 62 and 66, the action of which is instantaneous, such as neon tubes, are fixedly mounted behind disks 61ᵃ and 65, and 61ᵇ and 69, the light produced thereby illuminating the triangular shaped indices. The electrodes which lead the current to lamps 62 and 66 may be supplied by any of the means previously described, but, as shown, utilize transformers of the type disclosed in Fig. 1.

The motor at the transmitting station is provided with a small brake of any suitable type which, as shown diagrammatically, comprises a supporting arm or the like 59 which carries a brake shoe 57 frictionally engaging a drum or the like 56 secured to the shaft 43, said arm being adjustable to regulate the friction load by means of a screw 58. A somewhat similar brake is provided at the controlling receiving station comprising a brake shoe 72 which is adapted to be moved as by a handle 71 into momentary frictional engagement with a drum or the like 73 secured to shaft 61.

A brush 49 is provided at the transmitter which is fixedly mounted in any suitable manner and engages a rotating sector 48 secured to shaft 43, said brush being adapted for connection, at the will of the operator, with lamp or tube 62 of the precision indicator by means of a suitable switch 70. It will be seen that when switch 70 is thrown to connect brush 49 to the circuit of lamp 62, the flashes of the latter will give at the receiving station an indication of a fixed reference point with respect to shaft 43 at the transmitter.

In Fig. 7 there is shown a controlled receiving station which is similar to the controlling receiving station of Fig. 6 with the exception that worm wheel 68 and gear 64 are mounted on an independent shaft 74 which is adapted to be moved, as by means of a handle 74', by the receiving station operator to bring indices 63 and 67 opposite the corresponding indices of rotating discs 61ª and 61ᵇ, whereby the orders transmitted from the sending station of Fig. 5 are duplicated at the controlled receiving station of Fig. 7.

When operating the system disclosed in Figs. 5, 6 and 7, the synchronous motors driving shafts 43, 61 and 61' are first started and the indicators at all stations, transmitting and receiving, are preferably set at zero, or some other predetermined reading, by means of handles 50' and 74'. The motor at each of the receivers may then be synchronized with the transmitter motor by throwing switch 70 to its upper position, as shown in Figs. 6 and 7, so as to connect fixed brush 49 in circuit with lamp 62. If the triangular shaped index of rotatable disk 61ª is then illuminated by the flashes of lamp 62 at the precise instant when said index is in registration with counter index 63 of toothed disk 65, the latter then occupying a definite predetermined position relative to fixed brush 49 due to setting the indicator on zero or some other predetermined reading, it is an indication that the receiver motor is in synchronism with the transmitter motor. It will be understood that, if desired, the rotating index of disk 61ª may be compared with any suitable fixed mark instead of counter index 63 in order to perform the synchronizing operation. If the rotatable index of disk 61ª at any receiver does not register with the counter index or other fixed mark, thereby indicating that the motor of that particular receiver is not synchronized with that of the transmitter, synchronism may be effected by the manual operation of brake 72 as previously described. When the receiver motors have been synchronized with the transmitter motor, switches 70 may be returned to their normal positions wherein lamps 62 are in circuit with brush 45.

When it is desired to transmit an indication from the transmitting station to the various receiving stations, the auxiliary gun servant at the transmitting station, such as a directorscope operator, rotates shaft 50 in any suitable manner, as by handles 50', to the desired indication. This rotation of shaft 50 displaces brushes 45 and 47 which in turn causes lamps 62 and 66 to flash so as to illuminate the indices of rotatable disks 61ª and 61ᵇ at different points than they had been before shaft 50 was actuated. The proper indication which it is desired to transmit may then be received at the various receiving stations by rotating shafts 74 as by handles 74' until counter indices 63 and 67 again register with the indices of movable disks 61ª and 61ᵇ. The indices at the controlling receiver, shown in Fig. 6, will remain in registration during any change of indication by shaft 50 due to the fact that worm 68 and gear 64 are also mounted on shaft 50 so that the movements of indices 63 and 67 exactly follow those of brushes 45 and 47.

The advantage of the separate rough and precise indications afforded by the use of the two sets of brushes and disks renders the present invention especially well adapted for use in fire control systems for artillery where extreme accuracy of gun laying is desired, as well as the ability to make large changes in setting quickly and with minimum possibility of error.

As has been previously pointed out, although practice has shown that the phase displacement of the rotor with respect to the rotating field of the motors of the receivers remains constant during operation, practice has also shown that this phase displacement of the motor of the transmitter does not remain constant due to variations of the resisting couple exercised by the friction of the brushes and the rotating commutator. This change in phase displacement of the transmitter motor will be indicated to the auxiliary gun servant at the transmitting station by a simultaneous movement of the indices of the rotating disks 61ª and 61ᵇ out of registry with counter indices 63 and 67. To correct this condition which would introduce an error in the indications received at the receiving stations, the gun servant may actuate brake 57 of the transmitter so as to compensate for the variations in the resisting couple developed by the friction of the brushes and return the rotatable indices of the controlling receiver to their original positions in registration with the counter indices.

It has also been pointed out above that errors may be introduced into the indication transmitted due to wear of the brushes of the rotating commutator, causing displacement of the generatrix of contact of the brushes. Such a displacement would be indicated to the gun servant by a movement out of registry with its counter index of the movable index of the controlling receiver corresponding to the brush which is thus displaced. Since a displacement of brush 47 of the rough indicating system would effect a substantial error in the indication transmitted, this error may be corrected by operation of the differential gear mechanism 55 whereby the gun servant may displace worm 53 axially with respect to shaft 50 and thereby change the position of brush 47 until the movable index of disk 61ᵇ of the controlling receiver again registers with counter index 67. Although no compensating means has been shown for correcting errors due to displacement of brush 45 of the precise indicating system, it will be understood that if such correction is desirable, suitable means similar to differential gear 55 may be provided for this brush also.

It is to be understood that the drawings are diagrammatic and for purposes of illustration only and are not to be construed as a definition of the limits of the invention. Other forms of brake mechanisms may be substituted for those shown and described and the particular type of brake employed constitutes no part per se of the invention. Similarly any suitable means may be employed for energizing tube 27 from brush 25, any suitable type of radio transmitter and receiver may be substituted for those shown in Figs. 3 and 4, etc. without departing from the spirit of the invention. Reference is therefore to be had to the appended claims for a definition of the limits of the invention.

This application is a continuation of my application Serial No. 376,676, filed July 8, 1929, for Electrical distant indicating apparatus.

What is claimed is:

1. In electrical apparatus for transmitting indications from a transmitting station to a receiving station at a distance therefrom, a transmitter including a rotatable indicator element and a normally fixed indicator element, means for transmitting an electrical impulse whenever a certain point on said rotatable element occupies a predetermined position with respect to said normally fixed element, a receiver at the receiving station including a rotatable indicator element and a normally fixed indicator element, means for manually varying the positions of said normally fixed indicator elements at both the transmitter and receiver independently of one another, an additional receiver of like construction located at the transmitting station, the normally fixed indicator element at said last-named receiver being mechanically coupled to and movable by the means for manually varying the position of the normally fixed indicator element of the transmitter, synchronous motors for driving said rotatable indicator elements, respectively, means responsive to said electrical impulses for simultaneously illuminating a point on the rotatable element of each of said receivers, and means for controlling the operation of the transmitter motor in accordance with observations of said last-named receiver.

2. In a distant indicating apparatus as defined in claim 1, a plurality of rotatable and normally fixed indicator elements at the transmitter and at each receiver for transmitting both a rough and a precise indication.

3. In a distant indicating apparatus as defined in claim 1, a plurality of rotatable and normally fixed indicator elements at the transmitter and at each receiver for transmitting both a rough and a precise indication, and means for correcting the position of the normally fixed indicator element of the transmitter which gives the rough indication independently of the normally fixed indicator element which gives the precise indication.

4. In a distant indicating apparatus as defined in claim 1, a permanently fixed indicator element at the transmitter, means for transmitting an electrical impulse whenever a certain point on the rotatable indicator element of the transmitter occupies a predetermined position with respect to said permanently fixed element, means operable at the will of the receiver operators for rendering the illuminating means of each of said receivers responsive to the electrical impulses from said permanently fixed element, and means for manually controlling the operation of the receiver motors in accordance with observations of said illuminations whereby the rotatable indicator elements of said receiver may be synchronized with the rotatable indicator element of said transmitter.

NICOLAS EMILIEN METHLIN.